(12) United States Patent
Matsumoto et al.

(10) Patent No.: US 8,610,993 B2
(45) Date of Patent: *Dec. 17, 2013

(54) LIGHT CONTROL DEVICE AND LIGHT CONTROL METHOD

(75) Inventors: Naoya Matsumoto, Hamamatsu (JP); Taro Ando, Hamamatsu (JP); Takashi Inoue, Hamamatsu (JP); Yoshiyuki Ohtake, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 201 days.

This patent is subject to a terminal disclaimer.

(21) Appl. No.: 13/141,556

(22) PCT Filed: Dec. 24, 2009

(86) PCT No.: PCT/JP2009/071443
§ 371 (c)(1),
(2), (4) Date: Aug. 3, 2011

(87) PCT Pub. No.: WO2010/074149
PCT Pub. Date: Jul. 1, 2010

(65) Prior Publication Data
US 2011/0317237 A1    Dec. 29, 2011

(30) Foreign Application Priority Data

Dec. 24, 2008  (JP) ............................... P2008-327855

(51) Int. Cl.
*G02F 1/01* (2006.01)
*G02F 1/03* (2006.01)

(52) U.S. Cl.
USPC .......................................... 359/279; 359/245

(58) Field of Classification Search
USPC .................. 359/211, 245, 249, 270, 290, 279
See application file for complete search history.

(56) References Cited

U.S. PATENT DOCUMENTS 5,151,814 A * 9/1992 Grinberg et al. ............ 359/209.1
6,456,419 B1 * 9/2002 Winker et al. ................ 359/279

(Continued)

FOREIGN PATENT DOCUMENTS

| JP | H4-163529   | 6/1992 |
|----|-------------|--------|
| JP | 2000-10058  | 1/2000 |
| JP | 2006-113185 | 4/2006 |
| JP | 2008-176150 | 7/2008 |

OTHER PUBLICATIONS

Matsumoto et al. "Generation of High-Quality Higher-Order Laguerre-Gaussian Beams Using Liquid-Crystal-on-Silicon Spatial Light Modulators," Jun. 23, 2008, Optical Society of America, vol. 25, pp. 1642-1650.*

(Continued)

*Primary Examiner* — Thomas K Pham
*Assistant Examiner* — William M Johnson
(74) *Attorney, Agent, or Firm* — Drinker Biddle & Reath LLP

(57) ABSTRACT

A light control device 1 includes a light source 10, a prism 20, a spatial light modulator 30, a drive unit 31, a control unit 32, a lens 41, an aperture 42, and a lens 43. The spatial light modulator 30 is a phase modulating spatial light modulator, includes a plurality of two-dimensionally arrayed pixels, is capable of phase modulation in each of these pixels in a range of $4\pi$, and presents a phase pattern to modulate the phase of light in each of the pixels. This phase pattern is produced by superimposing a blazed grating pattern for light diffraction with a phase modulation range of $2\pi$ or less and a phase pattern having a predetermined phase modulation distribution with a phase modulation range of $2\pi$ or less.

6 Claims, 16 Drawing Sheets

(56) References Cited

U.S. PATENT DOCUMENTS

| | | | |
|---|---|---|---|
| 7,209,279 B2* | 4/2007 | Igasaki et al. | 359/279 |
| 7,612,930 B2* | 11/2009 | Holmes | 359/279 |
| 2007/0035809 A1* | 2/2007 | Maram et al. | 359/298 |
| 2008/0174581 A1* | 7/2008 | Matsumoto et al. | 345/205 |
| 2009/0147330 A1* | 6/2009 | Seo et al. | 359/11 |
| 2010/0134869 A1* | 6/2010 | Bernet et al. | 359/290 |
| 2010/0277566 A1* | 11/2010 | Cable et al. | 348/40 |

OTHER PUBLICATIONS

Inoue et al. "LCOS Spatial Light Modulator Controlled by 12-bit Signals for Optical Phase-Only Modulation" Jan. 20, 2007, SPIE Digital Library vol. 6.*

Joseph P. Kirk et al., "Phase-Only Complex-Valued Spatial Filter," Journal of the Optical Society of America, Aug. 1971, pp. 1023-1028, vol. 61, No. 8.

Naoya Matsumoto et al., "Generation of high-quality higher-order Laguerre-Gaussian beams using liquid-crystal-on-silicon spatial light modulators," Journal of the Optical Society of America, Jul. 2008, pp. 1642-1651, vol. 25, No. 7.

Takashi Inoue et al., "Hamen Seigyo ni Tekishita Kukan Hikari Henchoki to Sore o Mochiita Laguere-Gaussian Beam Seisei—[English translation] A spatial light modulator suitable for wavefront control and Laguerre-Gaussian beam generation," Optics & Photonics Japan Koen Yokoshu, Nov. 4, 2008, pp. 416-417 [English translation included in contents of document entitled "Generation of high-quality-order Laguerre-Gaussian beams using liquid-crystal-on-silicon spatial light modulators"].

* cited by examiner

*Fig.6*

| PERIODIC PIXEL NUMBER | PHASE VALUE × $\pi$ (rad) |
| --- | --- |
| 1 | -0.4375 |
| 2 | -0.3125 |
| 3 | -0.1875 |
| 4 | -0.0625 |
| 5 | 0.0625 |
| 6 | 0.1875 |
| 7 | 0.3125 |
| 8 | 0.4375 |

LIGHT CONTROL DEVICE AND LIGHT CONTROL METHOD

TECHNICAL FIELD

The present invention relates to a light control device and a light control method.

BACKGROUND ART

Spatial light modulators can modulate the intensity or phase of input light in each of a plurality of two-dimensionally arrayed pixels. Such spatial light modulators include an intensity modulation type spatial light modulator that can modulate only the intensity, a phase modulation type spatial light modulator that can modulate only the phase, and an intensity and phase modulation type spatial light modulator that can modulate both of the intensity and phase. Light output after being modulated in intensity or phase in each pixel of the spatial light modulator, as a result of, for example, being condensed by a condensing optical system provided at a subsequent stage of the spatial light modulator, can process an object existing at its condensing position.

The intensity modulating spatial light modulator adjusts the transmittance of input light pixel by pixel, and cannot use light of a part that has not been transmitted therethrough, and is thus inferior in light utilization efficiency. It is not easy for the intensity and phase modulating spatial light modulator to control intensity modulation and phase modulation in each pixel independently of each other, and handling thereof is difficult.

On the other hand, the phase modulating spatial light modulator modulates the phase of input light pixel by pixel, and can output almost entire light, and is thus excellent in light utilization efficiency. Moreover, the phase modulating spatial light modulator, as a result of presenting a phase pattern prepared from a computer-generated hologram or the like, has a high degree of freedom in the phase distribution in a beam section of output light, and has a high degree of freedom in the condensing position of output light by the condensing optical system. As an application of light control using such a phase modulating spatial light modulator, processing of the surface and interior of a processing object, generation of a Laguerre-Gaussian mode beam, and the like can be mentioned.

Moreover, it has been known that the intensity of outputting light that is phase-modulated pixel by pixel in the phase modulating spatial light modulator can be modulated (refer to Non-Patent Literature 1). This is for causing the phase modulating spatial light modulator to present a phase pattern produced by superimposing a blazed grating pattern for light diffraction and a phase pattern having a predetermined phase modulation distribution, and adjusting the light diffraction efficiency in the spatial light modulator by adjusting the blazed grating pattern. Accordingly, it has been considered that light that is output after being diffracted by the spatial light modulator can have a desired intensity distribution and phase distribution in its beam section.

Moreover, it has been considered that, generally, since the phase α of a light wave is equivalent to a phase (α+2nπ), it is sufficient that optical phase modulation in each pixel of the spatial light modulator is possible in a range of 2π. Here, n is an arbitrary integer. For example, when the phase modulation amount exceeds 2π, it suffices to add or subtract 2nπ with respect to the phase modulation amount (hereinafter, referred to as "phase folding") to thereby make the phase modulation amount a value within a range from 0 to 2π. It has been considered that, even if the phase modulation amount after phase folding is thus provided as the phase modulation amount of each pixel of the spatial light modulator, no problem arises in principle.

Conventional spatial light modulators are set so as to have a phase modulation range of 2π. This is because, if the phase modulation range in the spatial light modulator is 2π, a phase modulation exceeding 2π can also be expressed in principle by performing phase folding in the phase pattern. Moreover, this is because a spatial light modulator having a phase modulation range exceeding 2π is not only redundant, but also causes a reduction in resolution and a reduction in response speed in terms of the relationship between the input gradation value and phase modulation amount.

CITATION LIST

Non Patent Literature

Non-Patent Literature 1: Joseph P. Kirk and Alan L. Jones, "Phase-only complex-valued spatial filter," Journal of the optical society of America, Vol. 61, No. 8, 1971

SUMMARY OF INVENTION

Technical Problem

Meanwhile, the present inventor has been engaged in various research and development, taking advantage of being able to cause a phase modulating spatial light modulator to present a phase pattern produced by superimposing a blazed grating pattern and a predetermined phase pattern, and to modulate the intensity of outputting light that is phase-modulated pixel by pixel in this spatial light modulator. The present inventor, in the course of research and development, has discovered that a phenomenon of the intensity distribution and the phase distribution in a beam section of light output from the spatial light modulator different from the desired effect may occur, that is, a phenomenon resulting in degradation in beam quality of light output from the spatial light modulator may occur. Further, the present inventor has discovered that the phenomenon is due to phase folding.

The present invention has been made in order to solve the above problems, and it is an object of the present invention to provide a light control device and light control method capable of obtaining light having a desired beam section in the technique of causing a phase modulating spatial light modulator to present a phase pattern produced by superimposing a blazed grating pattern and a phase pattern having a predetermined phase modulation distribution.

Solution to Problem

A light control device according to the present invention includes (1) a light source that outputs light, (2) a phase modulating spatial light modulator that is capable of phase modulation in each of a plurality of two-dimensionally arrayed pixels in a range of 4π, is input with light output from the light source, presents a phase pattern to modulate the phase of light in each of the pixels, and outputs light after being phase-modulated by this phase pattern, and (3) a control unit that causes the spatial light modulator to present a phase pattern produced by superimposing a blazed grating pattern for light diffraction with a phase modulation range of 2π or less and a phase pattern having a predetermined phase modulation distribution with a phase modulation range of 2π or less, and adjusts the light diffraction efficiency in the spatial light modulator by adjusting the blazed grating pattern.

In the light control device according to the present invention, it is preferable that the control unit causes the spatial light modulator to present a phase pattern for which the blazed grating pattern having a light diffraction efficiency distribution according to an intensity distribution in a beam section of a Laguerre-Gaussian mode beam with a specific index and the phase pattern having a phase modulation distribution according to a phase distribution in a beam section of the Laguerre-Gaussian mode beam are superimposed.

Moreover, in the light control device according to the present invention, it is preferable that the control unit causes the spatial light modulator to present a phase pattern for which the blazed grating pattern having a light diffraction efficiency distribution according to an intensity distribution of light having a specific intensity distribution and phase distribution in a beam section and the phase pattern having a phase modulation distribution according to the phase distribution are superimposed.

A light control method according to the present invention uses (1) a light source that outputs light, and (2) a phase modulating spatial light modulator that is capable of phase modulation in each of a plurality of two-dimensionally arrayed pixels in a range of 4π, is input with light output from the light source, presents a phase pattern to modulate the phase of light in each of the pixels, and outputs light after being phase-modulated by this phase pattern, and (3) causes the spatial light modulator to present a phase pattern produced by superimposing a blazed grating pattern for light diffraction with a phase modulation range of 2π or less and a phase pattern having a predetermined phase modulation distribution with a phase modulation range of 2π or less, and adjusts the light diffraction efficiency in the spatial light modulator by adjusting the blazed grating pattern.

It is preferable that the light control method according to the present invention causes the spatial light modulator to present a phase pattern for which the blazed grating pattern having a light diffraction efficiency distribution according to an intensity distribution in a beam section of a Laguerre-Gaussian mode beam with a specific index and the phase pattern having a phase modulation distribution according to a phase distribution in a beam section of the Laguerre-Gaussian mode beam are superimposed.

It is preferable that the light control method according to the present invention causes the spatial light modulator to present a phase pattern for which the blazed grating pattern having a light diffraction efficiency distribution according to an intensity distribution of light having a specific intensity distribution and phase distribution in a beam section and the phase pattern having a phase modulation distribution according to the phase distribution are superimposed.

Advantageous Effects of Invention

According to the present invention, light having a desired beam section can be obtained in the technique of causing a phase modulating spatial light modulator to present a phase pattern produced by superimposing a blazed grating pattern and a phase pattern having a predetermined phase modulation distribution.

BRIEF DESCRIPTION OF DRAWINGS

FIG. 6 is a table showing an example of the phase modulation amount of each pixel in the blazed grating pattern.

REFERENCE SIGNS LIST

Figure 1:
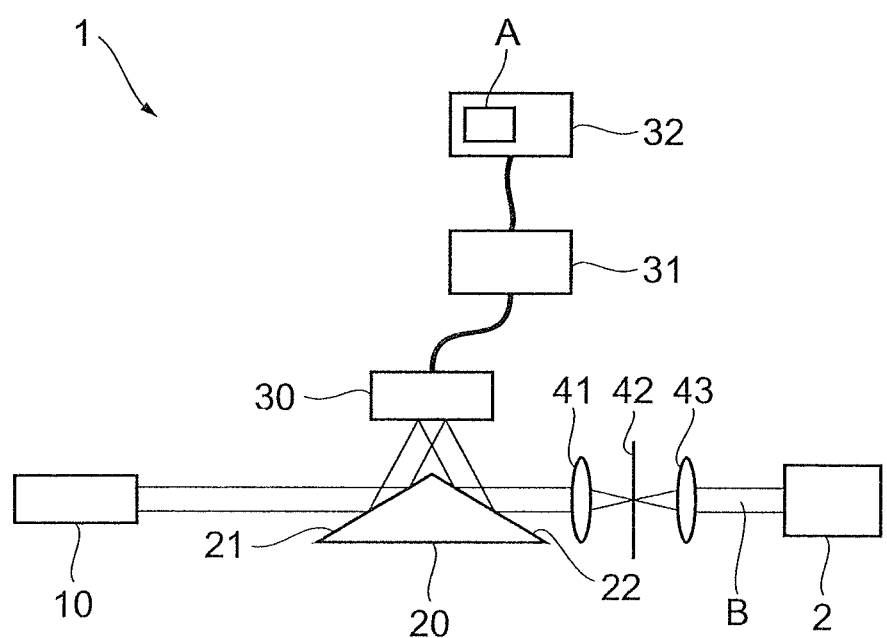
FIG. 1 is a configuration diagram of a light control device 1.

1 ... light control device, 2 ... imaging device, 10 ... light source, 20 ... prism, 30 ... spatial light modulator, 31 ... drive unit, 32 ... control unit, 41 ... lens, 42 ... aperture, 43 ... lens.

DESCRIPTION OF EMBODIMENTS

Hereinafter, the best mode for carrying out the present invention will be described in detail with reference to the accompanying drawings. Also, the same components are denoted with the same reference numerals in the description of the drawings, and overlapping description will be omitted.

FIG. 1 is a configuration diagram of a light control device 1. The light control device 1 shown in this figure includes a light source 10, a prism 20, a spatial light modulator 30, a drive unit 31, a control unit 32, a lens 41, an aperture 42, and a lens 43. Also, in this figure, not only the light control device 1 but also an imaging device 2 is shown.

The phase modulating spatial light modulator to be used in the present invention may be either a reflection type or a transmission type. The reflective spatial light modulator may be any of the LCOS (Liquid Crystal on Silicon) type, the MEMS (Micro Electro Mechanical Systems) type, and the optical address type. Moreover, the transmissive spatial light modulator may be an LCD (Liquid Crystal Display) or the like. In FIG. 1, a reflective spatial light modulator is shown as the spatial light modulator 30.

The light source 10 is for outputting light that is required to be phase-modulated by the spatial light modulator 30, is preferably a laser light source, may be a pulsed laser light source such as a femtosecond laser light source and a Nd:YAG laser light source, and may be a CW laser light source such as a He—Ne laser light source. It is preferable that light output from the light source 10 is collimated by a collimator lens after passing through a spatial filter.

The prism 20 has a first reflecting surface 21 and a second reflecting surface 22. The first reflecting surface 21 of the prism 20 is input with light output from the light source 10, and reflects the light toward the spatial light modulator 30. The second reflecting surface 22 of the prism 20 is input with light output from the spatial light modulator 30, and reflects the light toward the lens 41.

The spatial light modulator 30 is a phase modulating spatial light modulator, includes a plurality of two-dimensionally arrayed pixels, is capable of phase modulation in each of these pixels in a range of $4\pi$, and can present a phase pattern to modulate the phase of light in each of the pixels. The spatial light modulator 30 is input with light that has reached after being output from the light source 10 and reflected on the first reflecting surface 21 of the prism 20, and outputs the light after being phase-modulated by the phase pattern to the second reflecting surface 22 of the prism 20. Examples of the phase pattern to be presented in the spatial light modulator 30 that can be mentioned include a CGH (Computer-Generated Hologram) determined by numerical calculation.

The drive unit 31 is for setting the phase modulation amount in each of the two-dimensionally arrayed pixels of the spatial light modulator 30, and provides a signal for the pixel-by-pixel setting of the phase modulation amount to the spatial light modulator 30. The drive unit 31 sets the phase modulation amount in each of the two-dimensionally arrayed pixels of the spatial light modulator 30 to thereby cause the spatial light modulator 30 to present a phase pattern.

The control unit 32 is formed of, for example, a computer, and controls operation of the drive unit 31 to thereby cause a phase pattern to be written into the spatial light modulator 30 from the drive unit 31. That is, the control unit 32 stores a phase pattern A that is required to be presented by the spatial light modulator 30, or prepares that phase pattern A, and causes the phase pattern A to be written into the spatial light modulator 30 from the drive unit 31.

This phase pattern A is produced by superimposing a blazed grating pattern for light diffraction with a phase modulation range of $2\pi$ or less and a phase pattern having a predetermined phase modulation distribution with a phase modulation range of $2\pi$ or less. This phase pattern having a predetermined phase modulation distribution preferably includes a component to realize a desired phase distribution in a light beam section, and also further includes a component to correct a phase distortion of an optical system including the spatial light modulator 30 in the light control device 1. The light diffraction efficiency in the spatial light modulator 30 can be adjusted by adjusting the blazed grating pattern.

The lens 41 is input with light output from the spatial light modulator 30 and reflected on the second reflecting surface 22 of the prism 20. The lens 41 and the lens 43 form a 4f optical system, and has an opening of the aperture 42 disposed at a focal position therebetween. The aperture 42 is disposed so that only diffracted light of a desired order passes therethrough.

The imaging device 2 receives light B output from the lens 43 of the light control device 1, and obtains an intensity distribution in a beam section of the light B. The imaging device 2 is for observing the quality of light output from the light control device 1. Also, in the case of use for processing or the like, a new lens is disposed at a subsequent stage of the lens 43, and a processing object is disposed at its condensing position.

The general operation of the light control device 1 is as follows. By the drive unit 31 controlled by the control section 32, a phase pattern produced by superimposing a blazed grating pattern and a phase pattern is presented in the spatial light modulator 30. The light output from the light source 10 is reflected on the first reflecting surface 21 of the prism 20, and input to the spatial light modulator 30.

The light input to the spatial light modulator 30 is output after being diffracted by the blazed grating pattern out of the phase pattern presented in the spatial light modulator 30. The diffraction efficiency at that light diffraction varies depending on the shape of the blazed grating pattern, and may vary depending on the position on a light incident surface of the spatial light modulator 30. Moreover, the light diffracted and output from the spatial light modulator 30 has been phase-modulated by the phase pattern having a predetermined phase modulation distribution out of the phase pattern presented in the spatial light modulator 30.

The light output from the spatial light modulator 30 is reflected on the second reflecting surface 22 of the prism 20, passes through the lens 41, the aperture 42, and the lens 43, and received by the imaging device 2 to obtain an intensity distribution in a light beam section. At this time, the lens 41, the aperture 42, and the lens 43 are formed in a configuration to allow diffracted light of a desired diffraction order out of the light output from the spatial light modulator 30 to selectively pass therethrough. Therefore, the light B to be output to the imaging device 2 from the lens 43 is a light having a desired intensity distribution and phase distribution.

Figure 2:
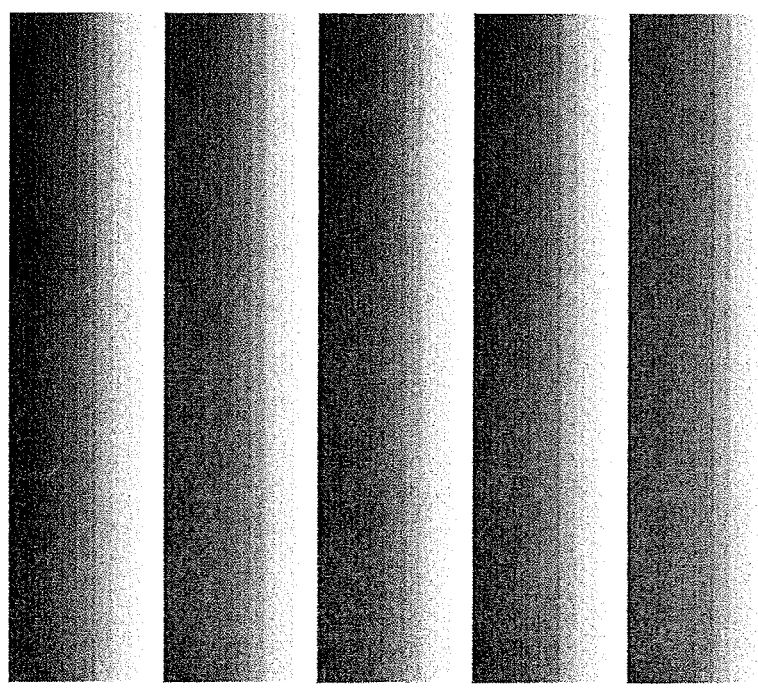
FIG. 2 is a view showing a blazed grating pattern.

Next, the phase pattern to be presented in the spatial light modulator 30 will be described in detail. This phase pattern is produced by superimposing a blazed grating pattern for light diffraction and a phase pattern having a predetermined phase modulation distribution. FIG. 2 is a view showing a blazed grating pattern. In this figure, the phase modulation amount (modulation width of $2\pi$) of each pixel is shown by grayscale. When light is input to the spatial light modulator 30 where such a blazed grating pattern is presented, the light is diffracted. The diffraction efficiency at that light diffraction varies depending on the shape of the blazed grating pattern.

A blazed grating pattern $\phi_{grating}$ having N pixels along a specific direction on the light incident surface of the spatial light modulator 30 as one period is expressed by the following formula (1). Here, n denotes a pixel position within the period along the specific direction. k can take a value not less than 0 and not more than 1. Therefore, the blazed grating pattern $\phi_{grating}$ has a phase modulation range of $2k\pi$, which is $2\pi$ or less.

[Numerical Formula 1]

$$\phi_{grating}(n) = 2\pi \cdot k \frac{n - N/2}{N} \qquad (1)$$

The theoretical diffraction efficiency $I_{+1th}$ of this blazed grating pattern $\phi_{grating}$ is expressed by the following formula (2), and varies depending on the k-value. Where k takes a value of 1, the theoretical diffraction efficiency $I_{+1th}$ has the maximum value of 1.

[Numerical Formula 2]

$$I_{+1th} = \frac{\sin(\pi(1-k))}{\pi(1-k)} \quad (2)$$

Figure 3:
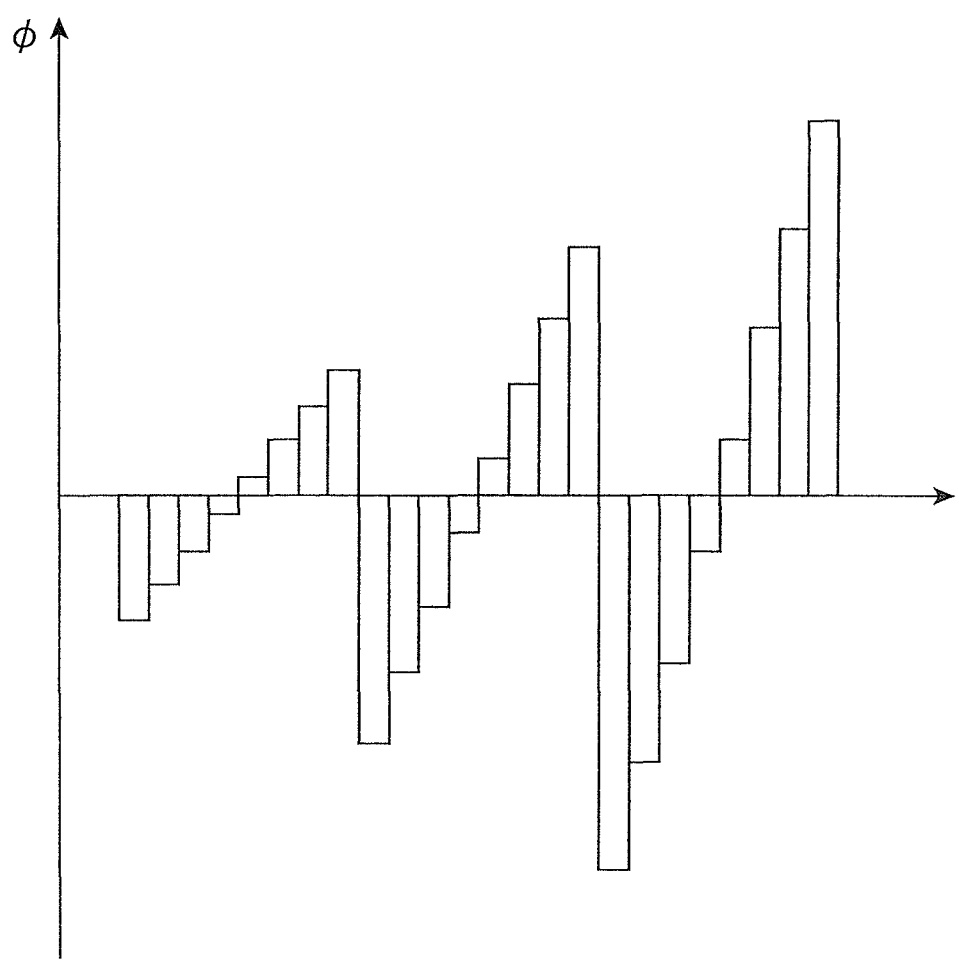
FIG. 3 is a chart showing an example of the phase modulation distribution in a blazed grating pattern.
Figure 4:
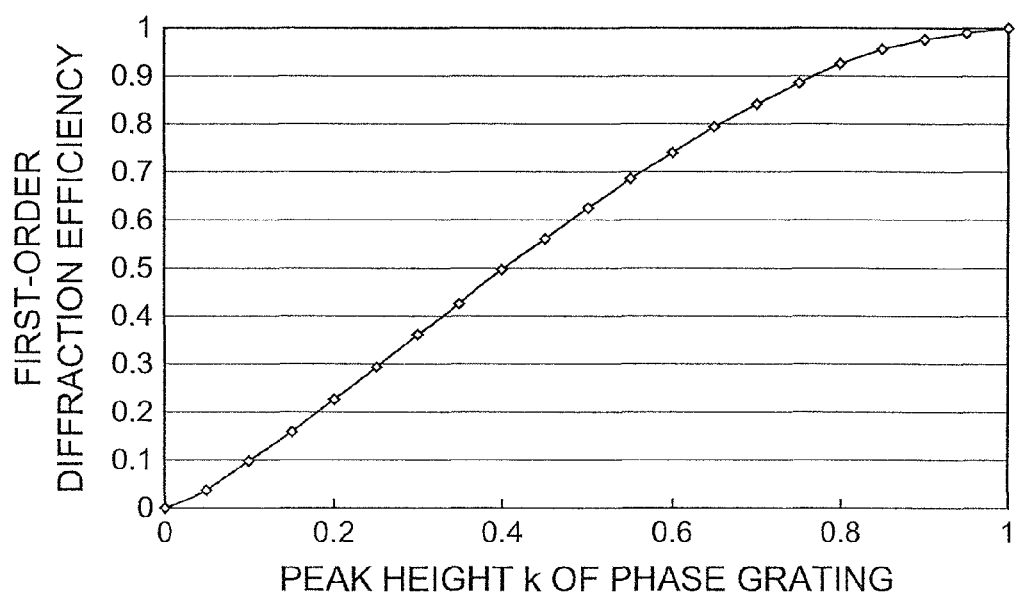
FIG. 4 is a graph showing a relationship between the k-value and diffraction efficiency in a blazed grating pattern presented in an actual spatial light modulator.

Therefore, if the k-values are uneven and distributed in the light incident surface of the spatial light modulator 30, the light diffraction efficiency in the light incident surface of the spatial light modulator 30 is also distributed. FIG. 3 is a chart showing an example of the phase modulation distribution in a blazed grating pattern $\phi_{grating}$. In this figure, the horizontal axis indicates the pixel position. As in the example shown in this figure, when the k-value becomes larger as it moves to the right, the diffraction efficiency becomes higher as it moves to the right. FIG. 4 is a graph showing a relationship between the k-value and diffraction efficiency in a blazed grating pattern $\phi_{grating}$ presented in an actual spatial light modulator. As shown in this figure, the larger the k-value, the higher the diffraction efficiency. In addition, the angle of diffraction does not depend on the k-value.

A phase pattern $\phi_{result}$ to be presented in the spatial light modulator 30 is a pattern for which the blazed grating pattern $\phi_{grating}$ as described above and a desired phase pattern $\phi_{desire}$ serving as a phase pattern are superimposed, and is expressed by the following formula (3). Alternatively, a phase pattern $\phi_{result}$ to be presented in the spatial light modulator 30 is produced by superimposing the blazed grating pattern $\phi_{grating}$ as described above, a desired phase pattern $\phi_{desire}$ serving as a phase pattern, and a distortion correction pattern $\phi_{correction}$, and expressed by the following formula (4).

[Numerical Formula 3]

$$\phi_{result} = \phi_{grating} + \phi_{desire} \quad (3)$$

[Numerical Formula 4]

$$\phi_{result} = \phi_{grating} + \phi_{desire} + \phi_{correction} \quad (4)$$

The desired phase pattern $\phi_{desire}$ is a pattern to realize a desired phase distribution in a light beam section, and its phase modulation range is $2\pi$ or less. Moreover, the distortion correction pattern $\phi_{correction}$ is a pattern to correct a phase distortion of the optical system in the light control device 1, and the phase modulation range is generally on the order of a few $\pi$. The phase distortion of the optical system in the light control device 1 can exist in the first reflecting surface 21 and the second reflecting surface 22 of the prism 20, the spatial light modulator 30, and the lenses 41 and 43. The light diffracted and output from the spatial light modulator 30 where such a phase pattern $\phi_{result}$ is presented has a desired intensity distribution and phase distribution in its beam section.

In the following, for simplification of description, the above-described formula (3) and formula (4) will be expressed by the following formula (5). A phase pattern $\phi_{phase}$ in this formula (5) is the desired phase pattern $\phi_{desire}$ in the formula (3), or is alternatively a sum of the desired phase pattern $\phi_{desire}$ and the distortion correction pattern $\phi_{correction}$ in the formula (4).

[Numerical Formula 5]

$$\phi_{result} = \phi_{grating} + \phi_{phase} \quad (5)$$

Particularly, in the present embodiment, by the following formula (6), phase folding is performed for a phase pattern $\phi_{phase}$, and the phase pattern $\phi_{phase}$ after phase folding is superimposed on the blazed grating pattern $\phi_{grating}$ to provide this as the phase pattern $\phi_{result}$ to be presented in the spatial light modulator 30. The phase pattern $\phi_{phase}$ after phase folding has a phase modulation range of $2\pi$ or less.

[Numerical Formula 6]

$$\phi_{phase} = \mathrm{mod}(\phi_{phase}, 2\pi) \quad (6)$$

Figure 5:
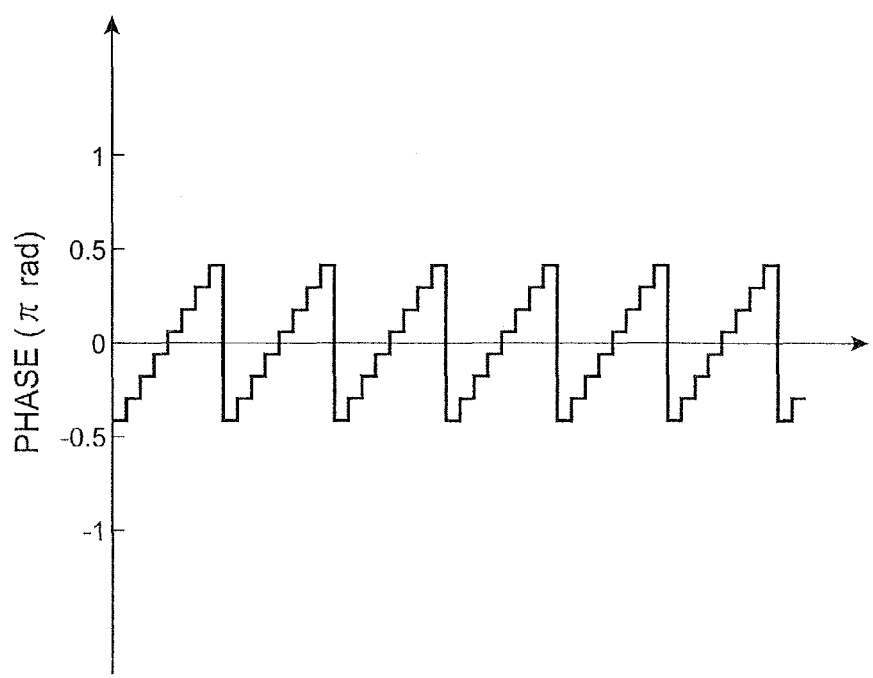
FIG. 5 is a chart showing an example of the phase modulation distribution in a blazed grating pattern.

The phase pattern $\phi_{result}$ to be presented in the spatial light modulator 30 has a phase modulation range of $4\pi$ or less in the present embodiment. As an example of the blazed grating pattern $\phi_{grating}$ included in this phase pattern $\phi_{result}$, one shown in FIG. 5 and FIG. 6 is considered. FIG. 5 is a chart showing an example of the phase modulation distribution in a blazed grating pattern. In this figure, the horizontal axis indicates the pixel position. Moreover, FIG. 6 is a table showing an example of the phase modulation amount of each pixel in the blazed grating pattern. In this blazed grating pattern $\phi_{grating}$, the k-value is 0.5, the N-value is 8, and the difference in the phase modulation amount between two adjacent pixels is $0.125\pi$. In FIG. 5, the blazed grating pattern $\phi_{grating}$ for approximately six periods is shown.

Figure 7:
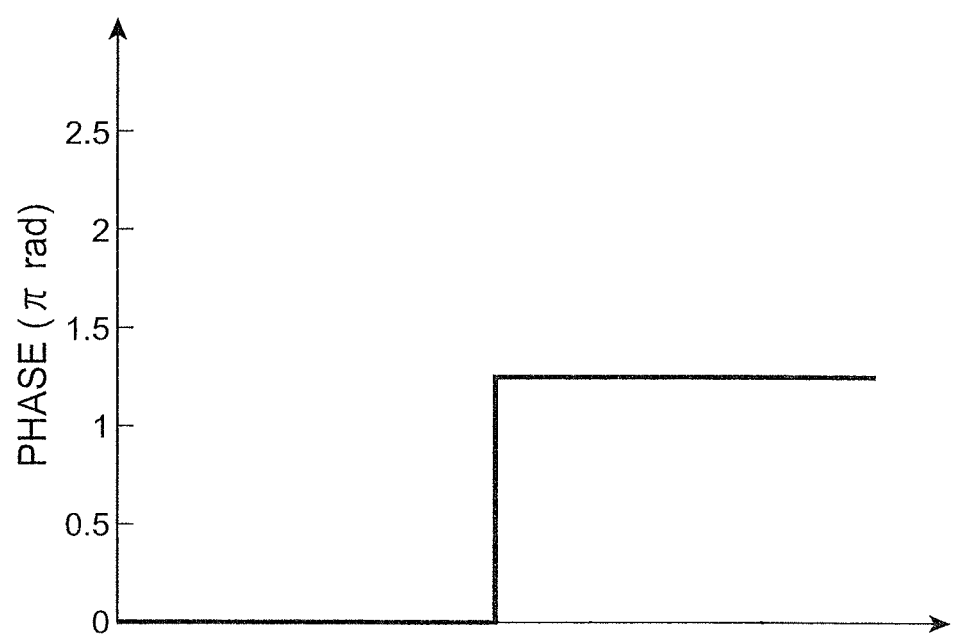
FIG. 7 is a chart showing an example of the phase modulation distribution in a phase pattern.

As an example of the phase pattern $\phi_{phase}$ included in the phase pattern $\phi_{result}$, one shown in FIG. 7 is considered. FIG. 7 is a chart showing an example of the phase modulation distribution in a phase pattern. In this figure, the horizontal axis indicates the pixel position. This phase pattern $\phi_{phase}$, as a result of phase folding of $2\pi$ performed according to necessity, includes a part where the phase modulation amount is 0 and a part where the phase modulation amount is $1.25\pi$.

Figure 8:
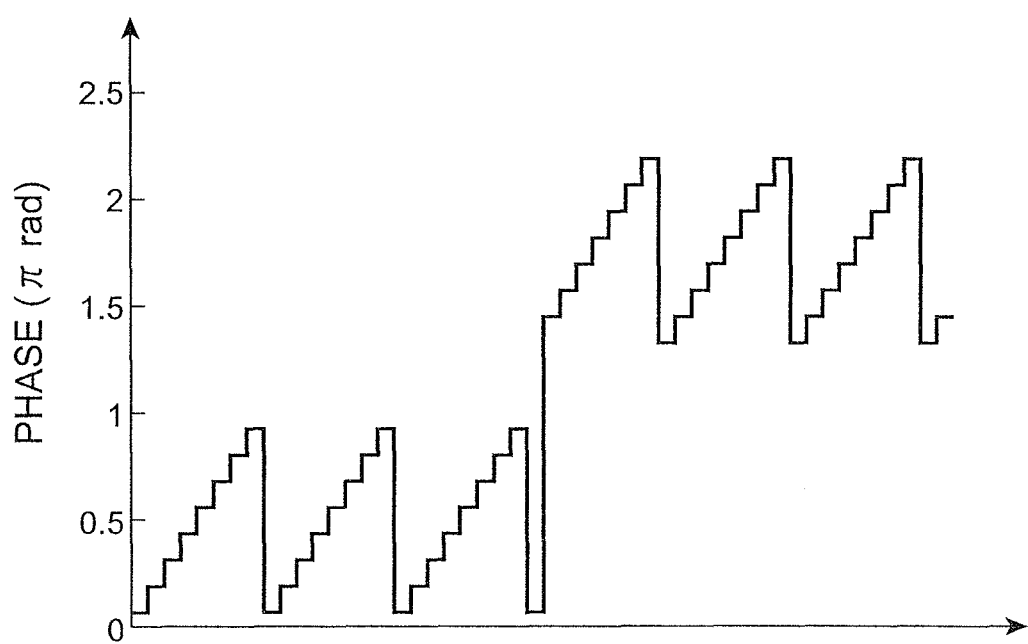
FIG. 8 is a chart showing a phase modulation distribution in a phase pattern where the blazed grating pattern (FIG. 5 and FIG. 6) and the phase pattern having a predetermined phase modulation distribution (FIG. 7) are superimposed.

FIG. 8 is a chart showing a phase modulation distribution in a phase pattern $\phi_{result}$ where the blazed grating pattern $\phi_{grating}$ (FIG. 5 and FIG. 6) and the phase pattern $\phi_{phase}$ (FIG. 7) are superimposed. In this figure, the horizontal axis indicates the pixel position. In the phase pattern $\phi_{result}$ shown in this figure, the phase modulation amount is $2\pi$ or more.

Figure 9:
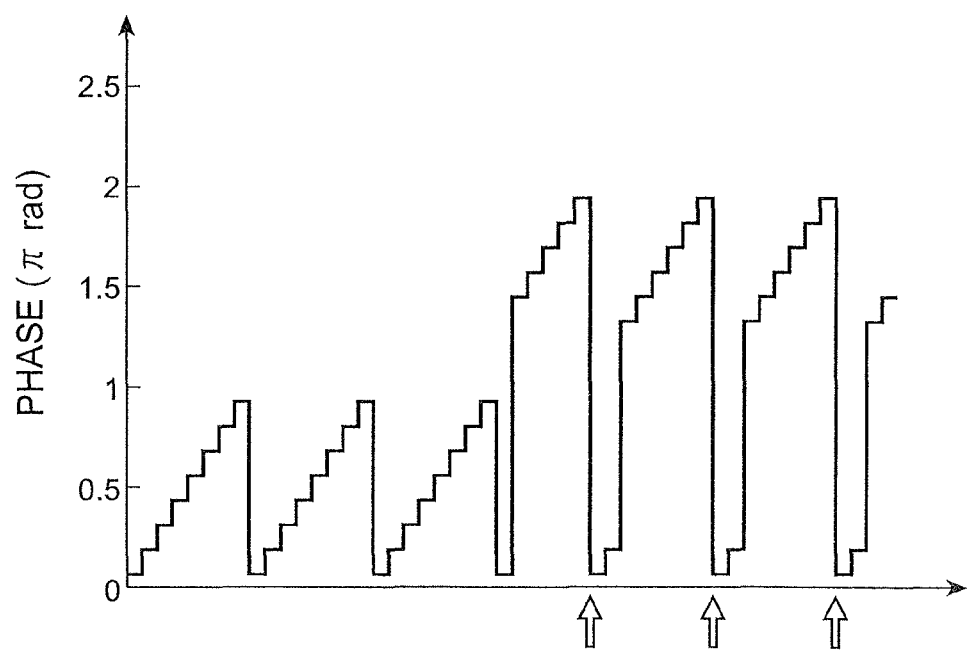
FIG. 9 is a chart showing a phase modulation distribution in a phase pattern after performing phase folding for the phase pattern $\phi_{result}$ (FIG. 8).

FIG. 9 is a chart showing a phase modulation distribution in a phase pattern after performing phase folding by $2\pi$ for the phase pattern $\phi_{result}$ (FIG. 8). In this figure as well, the horizontal axis indicates the pixel position. In the phase modulation distribution in the phase pattern (FIG. 9) after phase folding, $2\pi$ has been subtracted from the phase modulation amounts for pixels with phase modulation amounts exceeding $2\pi$ in the phase pattern $\phi_{result}$ (FIG. 8) before phase folding, and the phase modulation amount in each pixel is in a range from 0 to $2\pi$.

In the case of the present embodiment where the spatial light modulator 30 having a phase modulation range of $4\pi$ is used, the phase pattern (FIG. 8) before phase folding ($4\pi$ or less) is presented in that spatial light modulator 30. On the other hand, in the case of a comparative example where a spatial light modulator having a phase modulation range of $2\pi$ is used, the phase pattern (FIG. 9) after phase folding is presented in that spatial light modulator.

The phase pattern (FIG. 8) before phase folding and the phase pattern (FIG. 9) after phase folding have mutually equivalent effects in principle. However, in an actual spatial light modulator, a region called a flyback region where the phase is rounded to cause an incorrect display exists in a part where the difference in the phase modulation amount between two adjacent pixels is large. That is, as compared to the phase pattern (FIG. 8) before phase folding, in the phase pattern (FIG. 9) after phase folding, the flyback regions exist at the positions shown by the arrows in the figure, and accordingly, light having a desired intensity distribution and phase distribution cannot be obtained.

In the case of a comparative example where the phase pattern (FIG. 9) after phase folding is presented in the spatial light modulator having a phase modulation range of $2\pi$, the difference in the phase modulation amount between two adjacent pixels that has been slight before phase folding becomes approximately 2π after phase folding. When an actual spatial light modulator is made to present such a phase pattern after phase folding, in a part where the difference in the phase modulation amount is large between two adjacent pixels in that spatial light modulator, the phase modulation amount cannot completely sharply change, and crosstalk occurs between the two adjacent pixels. Such a part (flyback region) where crosstalk exists is considered to have a particularly remarkable effect when there is a step of approximately 2π in the phase modulation amount between the two adjacent pixels and the flyback region exists within the periodic structure of a blazed grating pattern.

In the case where a change in the phase modulation amount in the phase pattern to be presented in the spatial light modulator is relatively moderate, there are few flyback regions, and the effect that the flyback regions have on the intensity distribution and phase distribution in a beam section of a light output from the spatial light modulator can be mostly disregarded.

Figure 10:
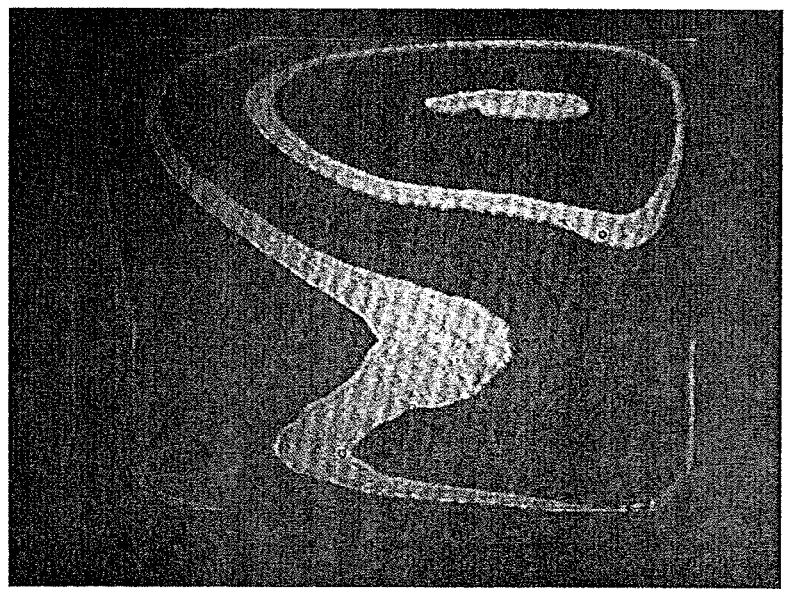
FIG. 10 is a view showing an example of the intensity distribution in a beam section of light output from a spatial light modulator in the case of a comparative example.

FIG. 10 is a view showing the intensity distribution in a beam section of light output from a spatial light modulator as another example of the comparative example. This is a result obtained by displaying in the spatial light modulator 30 a pattern for which a blazed grating pattern $\phi_{grating}$, a desired phase pattern $\phi_{desire}$, and a distortion correction pattern $\phi_{correction}$ are superimposed, and phase folding is applied by 2π. A spatial light modulator having a phase modulation amount of 2π is used here. Moreover, the desired phase pattern $\phi_{desire}$ is with the intention that the intensity distribution in a beam section of light output from the spatial light modulator becomes uniform. In the intended intensity distribution in a beam section of light, the black region in the figure is to extend over the whole area entirely. However, in the actually obtained intensity distribution in a beam section of light, regions with a strong intensity (white regions in the figure) exist against the intention described above. This is because, besides the blazed grating pattern $\phi_{grating}$ having many flyback regions, the phase pattern $\phi_{result}$ produced by superimposing thereon the desired phase pattern $\phi_{desire}$ and the distortion correction pattern $\phi_{correction}$ has still more flyback regions.

In the comparative example, a part where a failure has been actually found in a beam section of output light is coincident with a place where the phase modulation amount sharply changes in the phase pattern. In an actual spatial light modulator, degradation in the quality of output light becomes a problem that cannot be disregarded. Thus, in the comparative example, light having a desired intensity distribution and phase distribution cannot be obtained due to the effect of flyback regions.

On the other hand, in the present embodiment, a phase pattern (for example, FIG. 8) with a phase modulation range of 4π or less is presented in the spatial light modulator 30 having a phase modulation range of 4π in each pixel. Therefore, light having a desired intensity distribution and phase distribution can be obtained in a beam section, without the necessity for performing phase folding.

Next, description will be given of the case where a Laguerre-Gaussian mode beam is generated by use of the light control device 1 according to the present embodiment. The Laguerre-Gaussian mode beam has an intensity distribution and phase distribution to be specified by a radial index and an azimuthal index in its beam section. In the following, description will be given of the case where a Laguerre-Gaussian mode beam with a radial index of 1 and an azimuthal index of 3 (hereinafter, described as an "$LG_{1,3}$ light") is generated.

Figure 11:
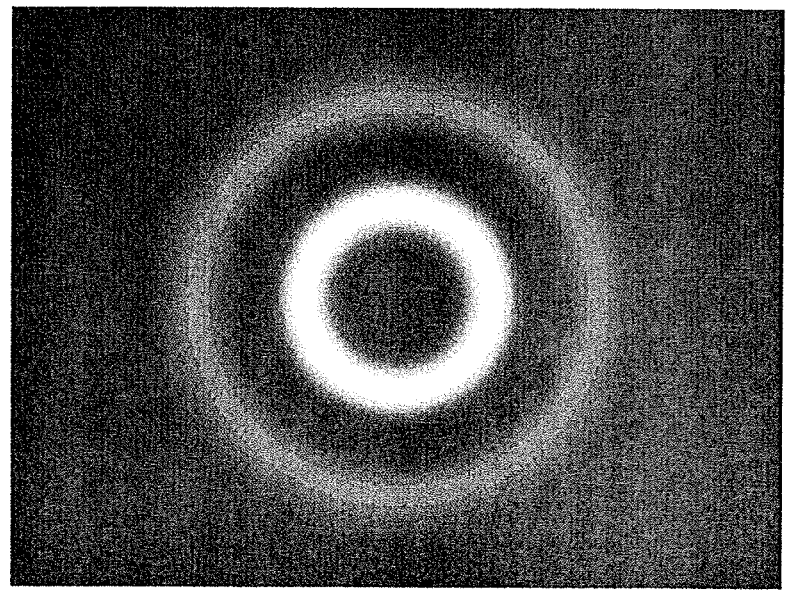
FIG. 11 is a view showing an intensity distribution in a beam section of an $LG_{1,3}$ light.
Figure 12:
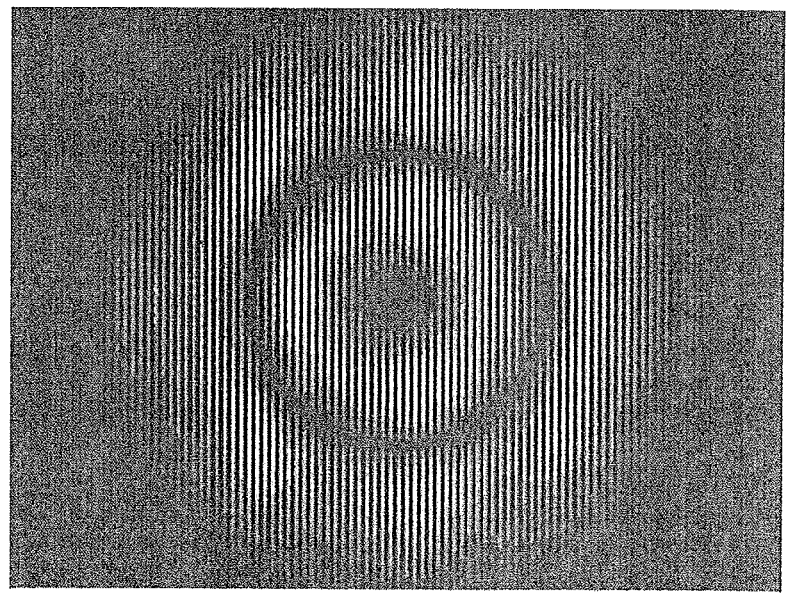
FIG. 12 is a view showing a blazed grating pattern $\phi_{grating}$ to obtain the intensity distribution (FIG. 11) in a beam section of an $LG_{1,3}$ light.
Figure 13:
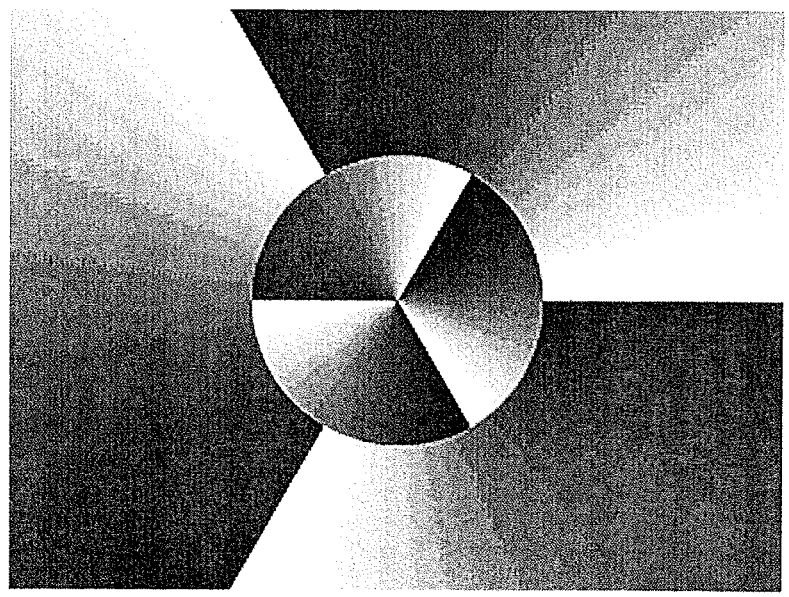
FIG. 13 is a view showing a desired phase pattern $\phi_{desire}$ to obtain a phase distribution in a beam section of an $LG_{1,3}$ light.

FIG. 11 is a view showing an intensity distribution in a beam section of an $LG_{1,3}$ light. A blazed grating pattern $\phi_{grating}$ is set so that the intensity distribution in a beam section becomes such a distribution as shown in the same figure. FIG. 12 is a view showing a blazed grating pattern $\phi_{grating}$ to obtain the intensity distribution (FIG. 11) in a beam section of an $LG_{1,3}$ light. Moreover, FIG. 13 is a view showing a desired phase pattern $\phi_{desire}$ to obtain a phase distribution in a beam section of an $LG_{1,3}$ light. In each of FIG. 12 and FIG. 13, the phase modulation amount of each pixel is shown by grayscale.

A phase pattern $\phi_{result}$ for generating an $LG_{1,3}$ light by the spatial light modulator 30 is a pattern for which the above-described blazed grating pattern $\phi_{grating}$ and desired phase pattern $\phi_{desire}$ are superimposed, and a distortion correction pattern $\phi_{correction}$ is further superimposed thereon. However, a phase pattern $\phi_{phase}$ being a sum of the desired phase pattern $\phi_{desire}$ and the distortion correction pattern $\phi_{correction}$ is applied with phase folding, and has a phase modulation range of 2π or less. This phase pattern $\phi_{result}$ is presented in the spatial light modulator 30.

In the present embodiment, since a phase pattern $\phi_{result}$ produced by superimposing a blazed grating pattern $\phi_{grating}$ for light diffraction with a phase modulation range of 2π or less and a phase pattern $\phi_{phase}$ having a predetermined phase modulation distribution with a phase modulation range of 2π or less is presented in the spatial light modulator 30 with a phase modulation range of 4π, an $LG_{1,3}$ light having a desired intensity distribution and phase distribution can be obtained, without the necessity for performing phase folding for the phase pattern $\phi_{result}$. On the other hand, in the comparative example, since a spatial light modulator with a phase modulation range of 2π is used, a phase pattern after phase folding is displayed in that spatial light modulator, and therefore, an $LG_{1,3}$ light having a desired intensity distribution and phase distribution cannot be obtained.

Figure 14:
FIG. 14 is a view showing an intensity distribution in a beam section of an $LG_{1,3}$ light generated by the present embodiment.
Figure 15:
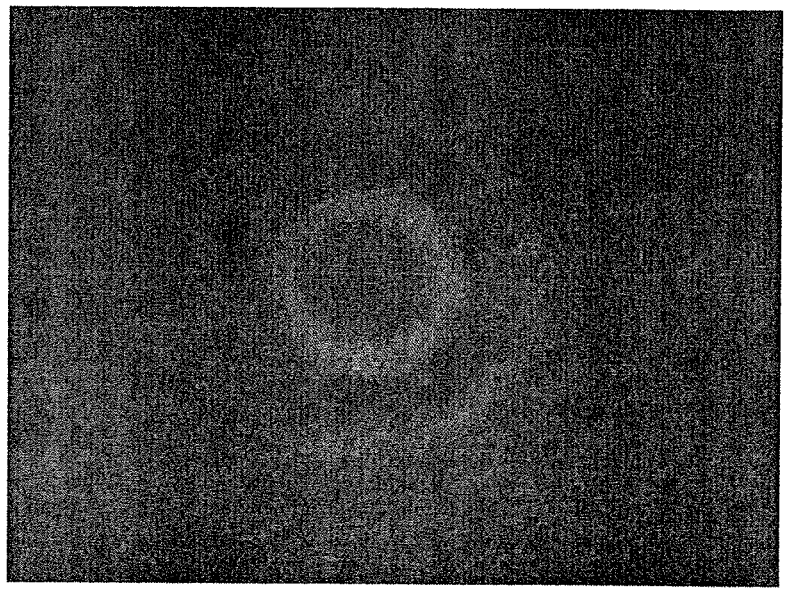
FIG. 15 is a view showing an intensity distribution in a beam section of an $LG_{1,3}$ light generated by the comparative example.

FIG. 14 is a view showing an intensity distribution in a beam section of an $LG_{1,3}$ light generated by the present embodiment. Moreover, FIG. 15 is a view showing an intensity distribution in a beam section of an $LG_{1,3}$ light generated by the comparative example. As can be understood by comparing both, the $LG_{1,3}$ light generated by the present embodiment has an intensity distribution close to a desired one in comparison with the $LG_{1,3}$ light generated by the comparative example.

A Laguerre-Gaussian mode beam to be thus generated by the light control device 1 according to the present embodiment is close to a desired one in terms of not only the phase distribution but also the intensity distribution in a beam section, and has high mode purity. Therefore, this Laguerre-Gaussian mode beam can be preferably used in optical tweezers or a quantum operation.

Figure 16:
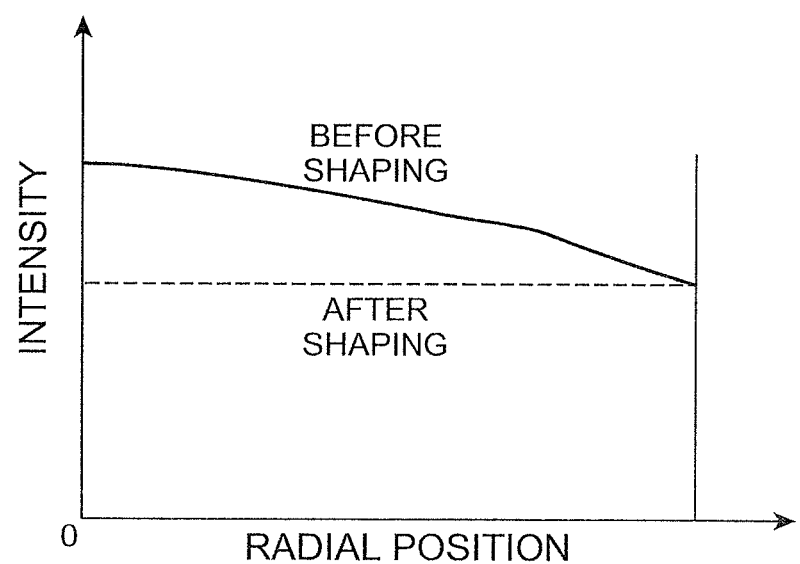
FIG. 16 is a chart showing examples of the intensity distribution before beam shaping and the intensity distribution after beam shaping.

Next, description will be given of beam shaping using the light control device 1 according to the present embodiment. Beam shaping is a technique for converting an input light where the intensity distribution in a beam section is non-uniform to an output light where the intensity distribution in a beam section is as desired. FIG. 16 is a chart showing examples of the intensity distribution before beam shaping and the intensity distribution after beam shaping. The solid line shows the intensity distribution before beam shaping, while the broken line shows the intensity distribution after beam shaping. It is provided that the closer to the center of the intensity distribution (solid line) before beam shaping, the stronger the intensity, and the intensity distribution (broken line) after beam shaping is uniform.

For a blazed grating pattern $\phi_{grating}$ to be used for this beam shaping, the distribution of k-values is set so as to have a diffraction efficiency distribution according to a ratio of the intensity distribution before beam shaping and the intensity distribution after beam shaping in a beam section. Moreover, a phase pattern $\phi_{result}$ to be presented in the spatial light modulator 30 is provided as one for which a desired phase pattern $\phi_{desire}$ and a distortion correction pattern $\phi_{correction}$ are superimposed on this blazed grating pattern $\phi_{grating}$. However, a phase pattern $\phi_{phase}$ being a sum of the desired phase pattern $\phi_{desire}$ and the distortion correction pattern $\phi_{correction}$ is applied with phase folding, and has a phase modulation range of $2\pi$ or less. This phase pattern $\phi_{result}$ is presented in the spatial light modulator 30. The phase modulation range in this phase pattern $\phi_{result}$ is $4\pi$ or less.

In the present embodiment, since a phase pattern $\phi_{result}$ produced by superimposing a blazed grating pattern $\phi_{grating}$ for light diffraction with a phase modulation range of $2\pi$ or less and a phase pattern $\phi_{phase}$ having a predetermined phase modulation distribution with a phase modulation range of $2\pi$ or less is presented in the spatial light modulator 30 with a phase modulation range of $4\pi$, a light after beam shaping having a desired intensity distribution and phase distribution can be obtained, without the necessity for performing phase folding for the phase pattern $\phi_{result}$. On the other hand, in the comparative example, since a spatial light modulator with a phase modulation range of $2\pi$ is used, a phase pattern after phase folding is displayed in that spatial light modulator, and therefore, a light after beam shaping having a desired intensity distribution and phase distribution cannot be obtained.

By thus performing beam shaping by the light control device 1 according to the present embodiment, an input light where the intensity distribution in a beam section is non-uniform can be converted to an output light where the intensity distribution in a beam section is as desired. For example, beam light with a Gaussian distribution can be shaped into beam light with a uniform distribution called a flat-top beam. Such a beam shaping technique is useful for processing applications, illumination for a microscope, and the like.

INDUSTRIAL APPLICABILITY

The present invention provides a light control device capable of obtaining light having a desired beam section in the technique of causing a phase modulating spatial light modulator to present a phase pattern produced by superimposing a blazed grating pattern and a phase pattern having a predetermined phase modulation distribution.

The invention claimed is:
1. A light control device comprising:
a light source that outputs light;
a phase modulating spatial light modulator that is capable of phase modulation in each of a plurality of two-dimensionally arrayed pixels in a range of $4\pi$, is input with light output from the light source, presents a phase pattern to modulate the phase of light in each of the pixels, and outputs light after being phase-modulated by this phase pattern; and
a control unit that causes the spatial light modulator to present a phase pattern produced by superimposing a blazed grating pattern for light diffraction with a phase modulation range of $2\pi$ or less and a phase pattern having a predetermined phase modulation distribution with a phase modulation range of $2\pi$ or less, and adjusts the light diffraction efficiency in the spatial light modulator by adjusting the blazed grating pattern, wherein
the phase modulation range of the phase pattern produced by superimposing the blazed grating pattern and the phase pattern having a predetermined phase modulation distribution is $2\pi$ or more; and
phase folding is not performed for the phase pattern produced by superimposing the blazed grating pattern and the phase pattern having a predetermined phase modulation distribution.

2. The light control device according to claim 1, wherein the control unit causes the spatial light modulator to present a phase pattern for which the blazed grating pattern having a light diffraction efficiency distribution according to an intensity distribution in a beam section of a Laguerre-Gaussian mode beam with a specific index and the phase pattern having a phase modulation distribution according to a phase distribution in a beam section of the Laguerre-Gaussian mode beam are superimposed.

3. The light control device according to claim 1, wherein the control unit causes the spatial light modulator to present a phase pattern for which the blazed grating pattern having a light diffraction efficiency distribution according to an intensity distribution of light having a specific intensity distribution and phase distribution in a beam section and the phase pattern having a phase modulation distribution according to the phase distribution are superimposed.

4. A light control method using:
a light source that outputs light; and
a phase modulating spatial light modulator that is capable of phase modulation in each of a plurality of two-dimensionally arrayed pixels in a range of $4\pi$, is input with light output from the light source, presents a phase pattern to modulate the phase of light in each of the pixels, and outputs light after being phase-modulated by this phase pattern,
a control unit for causing the spatial light modulator to present a phase pattern produced by superimposing a blazed grating pattern for light diffraction with a phase modulation range of $2\pi$ or less and a phase pattern having a predetermined phase modulation distribution with a phase modulation range of $2\pi$ or less, and adjusting the light diffraction efficiency in the spatial light modulator by adjusting the blazed grating pattern, wherein
the phase modulation range of the phase pattern produced by superimposing the blazed grating pattern and the phase pattern having a predetermined phase modulation distribution is $2\pi$ or more; and
phase folding is not performed for the phase pattern produced by superimposing the blazed grating pattern and the phase pattern having a predetermined phase modulation distribution.

5. The light control method according to claim 4, for causing the spatial light modulator to present a phase pattern for which the blazed grating pattern having a light diffraction efficiency distribution according to an intensity distribution in a beam section of a Laguerre-Gaussian mode beam with a specific index and the phase pattern having a phase modulation distribution according to a phase distribution in a beam section of the Laguerre-Gaussian mode beam are superimposed.

6. The light control method according to claim 4, for causing the spatial light modulator to present a phase pattern for which the blazed grating pattern having a light diffraction efficiency distribution according to an intensity distribution of light having a specific intensity distribution and phase distribution in a beam section and the phase pattern having a phase modulation distribution according to the phase distribution are superimposed.

* * * * *

UNITED STATES PATENT AND TRADEMARK OFFICE
CERTIFICATE OF CORRECTION

PATENT NO. : 8,610,993 B2  Page 1 of 1
APPLICATION NO. : 13/141556
DATED : December 17, 2013
INVENTOR(S) : Matsumoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 241 days.

Signed and Sealed this
Twenty-second Day of September, 2015

Michelle K. Lee
*Director of the United States Patent and Trademark Office*